Patented June 17, 1952

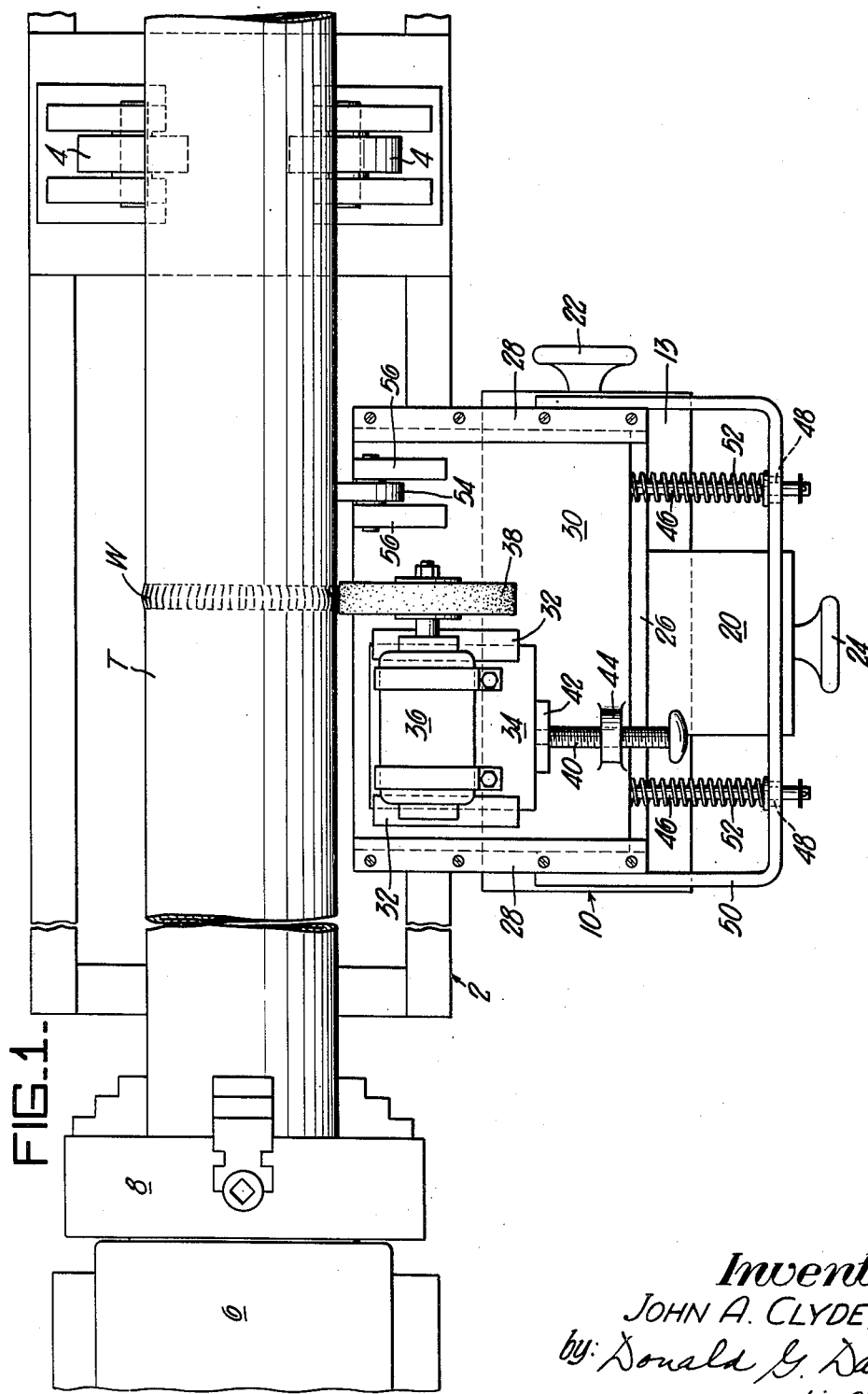

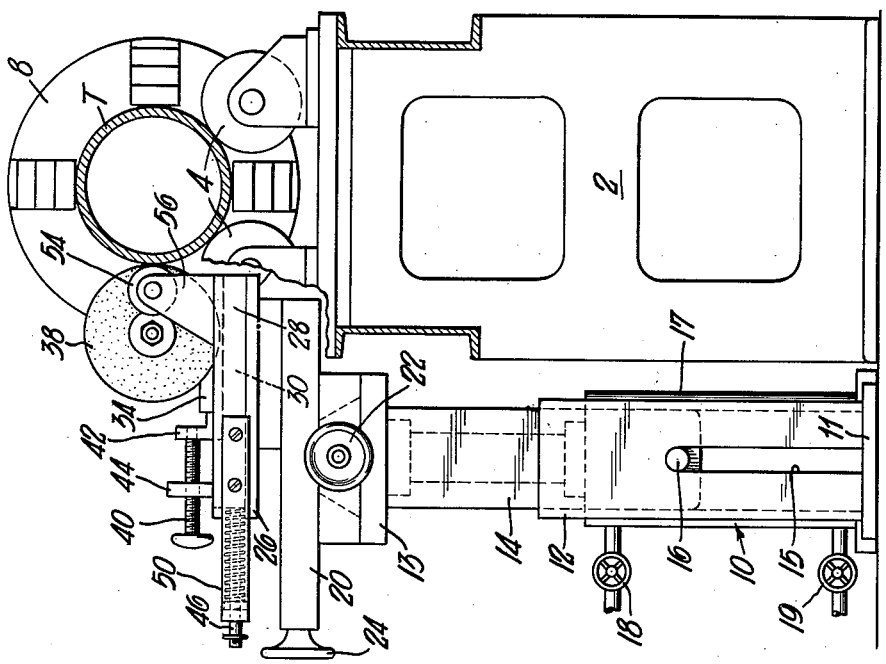

2,600,481

UNITED STATES PATENT OFFICE 2,600,481

GRINDING FIXTURE FOR WELDED TUBING

John A. Clyde, Ellwood City, Pa., assignor to United States Steel Company, a corporation of New Jersey Application May 28, 1951, Serial No. 228,617

3 Claims. (Cl. 51—105)

This invention relates to grinding apparatus and more particularly to apparatus for dressing the outer periphery of long lengths of tube, pipe and the like formed by welding two or more tubular sections end to end.

Because of limitations in size of billets and rolling equipment, long lengths of seamless tube, pipe and the like are produced by welding two or more rolled sections end to end. The nature of the welding operation results in a collar of excess metal at the joint. The amount of excess metal varies and must be removed since a uniform external diameter is required. Heretofore the removal has been accomplished by hand grinding. The operation has not been satisfactory. The welds often are undercut in spots thus weakening the joint.

It is an object of the present invention to provide apparatus for accurately removing the excess weld metal and providing a tube of uniform external diameter.

This and other objects will be made apparent from the following description when read in conjunction with the attached drawings wherein:

Figure 1 is a plan view of the apparatus of the present invention;

Figure 2 is a side elevation; and

Figure 3 is an end elevation thereof.

With particular reference to the drawings, the reference numeral 2 indicates a roller table for supporting a long length of tube T in grinding position, the tube T being formed of two lengths welded end to end at W. The table is provided with several pairs of rollers 4 arranged at intervals along its length to support the tube and facilitate rotation thereof. Each pair of rollers 4 are preferably provided with means, not shown, for adjusting their spacing and height to accommodate tubes of various diameters. Reference numeral 6 indicates a conventional lathe-head-stock having a hollow spindle and chuck 8 for gripping the tube, and drive and control means, not shown, for effecting the rotation thereof. As the general form of such apparatus is well known it has not been shown in detail.

The grinding apparatus of the present invention comprises an elevatable stand or table 10 having base members 11, half leg members 12 extending upwardly therefrom, a top member 13 and half leg members 14 extending downwardly from the top member. Base leg members 12 are of channel section and form guideways receiving top leg members 14, the mating surfaces being machined to provide an accurate sliding fit. The members 12 are preferably provided with slots 15 extending from the bottom to a point about half way of their height to receive stop pins 16 carried by the members 14. The raising and lowering of the table is accomplished by a fluid-actuated cylinder 17 positioned between the base and top members of the table 10, the cylinder being powered and controlled through valves 18 and 19.

Mounted on table 10 is a compound-slide 20 which is adjustable in the longitudinal direction of the tube by hand wheel 22 and in the transverse direction or normal to the tube by hand wheel 24. Since the construction of compound slides is well known the mechanical details thereof are omitted in the interest of brevity. Attached to the traversely movable element of slide 20 is a sub-base plate 26 which carries a pair of guideways 28 fastened to its upper surface. The latter slidably support a platen 30 for movement in the direction normal to the tube T. Guideways 32 mounted on platen 30 form a similar support for base plate 34 of motor 36 which carries grind-wheel 38. A manually operated feed-screw 40, rotatably attached to lug 42 on plate 34 and in threaded engagement with threaded lug 44 on platen 30, permits grind-wheel 38 to be advanced and retracted on platen 30 as conditions require.

Attached to and extending from the rearward edge of platen 30 are a pair of rods 46 which engage spaced guide-holes 48 in a U-shaped yoke 50 attached to the sub-base plate 26. A compression spring 52 is positioned between the yoke and the platen on each of the rods 46 and urges the platen toward tube T. This forward movement is limited by a tube-follower-roller 54 mounted in upwardly extending brackets 56 located toward the forward edge of platen 30 so that the roller overhangs the edge slightly. The center of the roller is preferably located at the same elevation as the center of the grind-wheel 38. The foregoing arrangement provides a resilient contact between the grind-wheel and the tube during the grinding operations.

At the start of operations, the table 10 of the grinding fixture is in its lowered position, the traverse slide of compound 20 retracted clear of roller table 2, and the grind-wheel 38 retracted clear of the forward edge of platen 30 in order to avoid damage to the apparatus during placing of the tube T. After the tube is delivered to roller table 2 and positioned and gripped in chuck 8, the table 10 is raised to its upper position, which is established by the stop 16 and slot 15, by manipulation of valves 18 and 19 of cylinder 17. The grind-wheel 38 is next brought into alignment with the weld W by adjustment of the longitudinal slide of compound 20 through the manipulation of hand wheel 22. The traverse slide of the compound is then run in until tube contact-roller 54 contacts the tube and a positive pressure is exerted on compression springs 52. The grinder-feed adjustment screw 40 is then rotated to bring the grind-wheel into light contact with the weld. The lathe is then started and the motor 36 turned on.

Since the tubes are seldom perfectly straight, they rotate with a slight wobbling motion. The horizontal component of this motion (usually less than one-fourth inch) is transmitted by roller 54 through platen 30 to the springs 52. Thus the grind-wheel is maintained in a constant position with respect to the outer periphery of the tube and uniform grinding action is achieved. Grinding pressure can be regulated by adjusting the position of the transverse slide of compound 20 which governs the initial degree of compression of springs 52. As the excess metal at the weld is removed the grind-wheel is advanced by means of feed-screw 40. The width of the circumferential band or belt of metal removed can be regulated by moving the grinder longitudinally of the tube by means of hand wheel 22 of compound 20. When all excess metal is ground down the outer diameter at the weld will conform to the diameter of the tube at the point of contact of guide-roller 54. The grinder motor is then shut down, the lathe-head stopped, the grind-wheel and traverse slide retracted and the table lowered to its bottom position. The finished tube can then be removed without danger to the grinding fixture and the apparatus is in condition to receive the next tube.

While I have shown and described a specific embodiment of my invention, it is apparent that modifications may arise. Therefore, I do not wish to be limited to the disclosure set forth but only by the scope of the appended claims.

I claim:

1. Apparatus for machining a circumferential belt on a length of tube, pipe or the like while supported horizontally for rotation about its axis, comprising a grinding fixture including an elevatable table, power means for raising and lowering the table, a support platen having forward and rearward edges slidably mounted on said table for movement toward the tube, resilient means for urging said platen toward the tube, a tube-contacting guide mounted on said platen and extending beyond the forward edge thereof, whereby the forward movement of the platen is limited, a grinder slidably mounted on said platen and positioned for rotation against the periphery of the tube and means for adjusting the position of the grinder with respect to the forward edge of the platen.

2. Apparatus for machining a circumferential belt on a length of tube, pipe or the like while supported horizontally for rotation about its longitudinal axis, comprising a grinding fixture including an elevatable table, power means for raising and lowering the table, a compound-slide carried by said table, a support platen having forward and rearward edges slidably mounted on the aforementioned compound-slide, resilient means for urging said platen toward the tube, a tube-contacting guide mounted on said platen and extending beyond the forward edge thereof, whereby the forward movement of the platen is limited, a grinder slidably mounted on said platen and positioned for rotation against the periphery of the tube and means for adjusting the position of the grinder with respect to the forward edge of the platen.

3. Apparatus for machining a circumferential belt on a length of tube, pipe or the like while supported horizontally for rotation about its axis, comprising a grinding fixture including an elevatable table, fluid actuated means for raising and lowering the table, a compound-slide carried by said table, a support platen having forward and rearward edges slidably mounted on the aforementioned compound-slide, a yoke attached to said compound-slide, resilient means positioned between said yoke and the rearward edge of the platen for urging the platen forwardly toward the tube, a rotatable tube-contacting guide mounted on said platen and extending beyond the forward edge thereof, whereby the forward movement of the platen is limited, a grinder slidably mounted on said platen and positioned for rotation against the periphery of the tube and means for adjusting the position of the grinder with respect to the forward edge of the platen.

JOHN A. CLYDE.

No references cited.